(12) United States Patent
Stolarczyk et al.

(10) Patent No.: US 7,675,289 B1
(45) Date of Patent: Mar. 9, 2010

(54) UNDERGROUND ANOMALIES DETECTION VEHICLE AND TRAILER

(75) Inventors: Larry G. Stolarczyk, Raton, NM (US); Tito Sanchez, Raton, NM (US); Gerald Stolarczyk, Raton, NM (US); Beaux Beard, Raton, NM (US); Eduardo Bonnin, Raton, NM (US); Ernest Salazar, Raton, NM (US); John Myers, Raton, NM (US); Chance Valentine, Raton, NM (US); Robert Troublefield, Raton, NM (US); John Howard, Raton, NM (US)

(73) Assignee: Stolar, Inc., Raton, NM (US)

( * ) Notice: Subject to any disclaimer, the term of this patent is extended or adjusted under 35 U.S.C. 154(b) by 0 days.

(21) Appl. No.: 12/497,657

(22) Filed: Jul. 4, 2009

(51) Int. Cl.
*G01V 3/12* (2006.01)
(52) U.S. Cl. ...................... 324/334; 324/337
(58) Field of Classification Search ............. 324/329, 324/332, 334, 337, 344–345
See application file for complete search history.

(56) References Cited

U.S. PATENT DOCUMENTS

| | | | | |
|---|---|---|---|---|
| 4,994,747 A | * | 2/1991 | Stolarczyk | 324/334 |
| 6,549,012 B2 | * | 4/2003 | Stolarczyk | 324/337 |
| 6,710,599 B2 | * | 3/2004 | Bosnar | 324/334 |
| 6,819,112 B2 | * | 11/2004 | Gianzero et al. | 324/343 |
| 7,629,790 B2 | * | 12/2009 | Stolarczyk et al. | 324/330 |

* cited by examiner

*Primary Examiner*—Bot L LeDynh
(74) *Attorney, Agent, or Firm*—Richard B. Main (57) ABSTRACT

A system for detection of linear underground anomalies passing under surface roads comprises an electromagnetic (EM) gradiometer mounted on a vehicle trailer. A transmitter is mounted to the front bumper of a car or vehicle towing the trailer and provides carrier synchronization information to the EM-gradiometer. An opportunistic radio station can be used as an illuminator. The transmitter or ground wave from an opportunistic radio station directs radio waves down into the ground where objects like linear underground anomalies and their equipment will produce reflections and scattered waves. These reflections will have phase angles and magnitudes that can be interpreted for characterizing information about the linear underground anomalies. Each EM-gradiometer measurement is tagged with GPS location information and then stored in a database. Subsequent passes over the same roadways and tracks are compared (change detection) to the earlier stored data. New linear underground anomalies and features become very obvious in these comparisons.

8 Claims, 5 Drawing Sheets

UNDERGROUND ANOMALIES DETECTION VEHICLE AND TRAILER

BACKGROUND OF THE INVENTION

1. Field of the Invention

The present invention relates to methods and devices for the detection of underground anomalies, and more particularly to the use of an electromagnetic gradiometer mounted to a vehicle trailer to detect linear underground anomalies crossing under border patrol roadways.

2. Description of Related Art

In the general case of having to detect linear underground anomalies from the surface, the orientation of the linear underground anomaly, if it exists, will be unknown. And its exact area will also be unknown unless there is some related surface feature or objective the anomalies involve.

However, in the case of detecting linear underground anomalies crossing under border patrol roadways, if the roadways are tight against a border, the linear underground anomalies will more or less pass orthogonally underneath. The search area required thus reduces from a two-dimensional field to a one dimensional line, the track of the roadway.

Various kinds of conventional technologies have been employed to detect and location underground anomalies, mines, and other structures. Many have used earth penetrating radar techniques. Others look for the secondary emissions from buried objects that occur when they are illuminated by primary radio sources. It is also fairly well understood that some radio frequencies will propagate through the ground better than others, and that will depend on soil conditions.

Primary electro-magnetic (EM) waves will interact with underground objects and infrastructures to create scattered EM-waves that are detectable on or above the earth's surface with a gradiometer. The Stolar, Inc. (Raton, N. Mex.) DeltaEM-gradiometer survey system provides a tool that can generate subsurface geophysical imaging capabilities with greater sensitivity, range (distance), and flexibility over existing instrumentation. In efforts using local radio sources, EM gradiometry has been shown to be a promising technique. The synchronized EM-gradiometer instrumentation is a narrowband receiver that can discriminate against the spectra noise components and operate in the low ionosphere-earth waveguide noise band, thus maximizing the detection threshold sensitivity of the instrumentation.

EM-gradiometers capitalize on their high threshold detection sensitivities to scattered EM-waves in the ELF/VLF bands, 3-3000 Hz and 3-30 kilohertz. Synchronization to the primary wave in the ELF/VLF bands enables very narrow-band detection with threshold detection sensitivity in the picoTesla (pT) range. Theoretical investigations have found that the secondary EM fields are 20-60 dB below that of the primary EM field components. A significant instrument design issue is the detection of the secondary fields in the presence of the much larger primary field components. This has been solved by the careful design of the gradiometer antennas that achieves 70 dB of primary field suppression.

Two important advantages in underground anomaly detection have been achieved. First, the magnitude of the scattered secondary wave from them increases as frequency decreases. Thus, waves in the ELF/VLF bands have a significant advantage in detection. Second, the attenuation rate of EM-waves in the ELF/VLF bands through soil/rock is very low, so deeply buried structures can be illuminated and detected. The structures may be empty passageways or may contain electrical conductors serving some utility and ventilation needs.

SUMMARY OF THE INVENTION

Briefly, a system for detection of linear underground anomalies passing under surface roads comprises an electromagnetic (EM) gradiometer mounted on a largely non-metallic vehicle trailer. A transmitter is mounted to the front bumper of a car or vehicle towing the trailer, and a fiberoptic cable to provide carrier synchronization information is run from the transmitter to the EM-gradiometer. The transmitter directs radio wave down into the ground where objects like linear underground anomalies and their equipment will produce reflections and scattered (secondary) waves. These reflections will have phase angles and magnitudes that can be interpreted for characterizing information about the linear underground anomalies. Each EM-gradiometer measurement is tagged with GPS location information and then stored in a database. Subsequent passes over the same roadways and tracks is compared to the earlier stored data. New linear underground anomalies and features become very obvious in these comparisons.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1A:
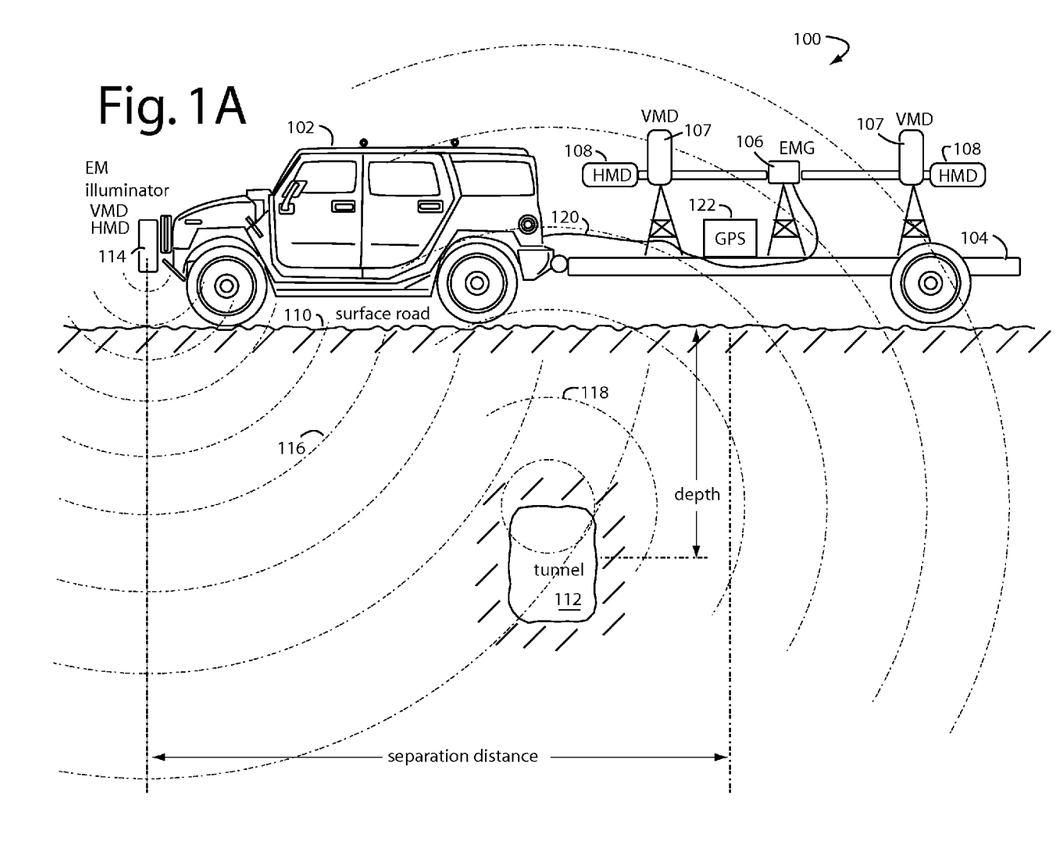
FIG. 1A is a side view diagram of a vehicle and trailer with an EM-gradiometer with VMD and HMD polarized antennas mounted on it, and a cutaway view of the earth with a surface road crossing above over a linear underground anomalies.

FIG. 1A represents a vehicle and trailer combination embodiment of the present invention, herein referred to by the general reference numeral 100. The combination 100 includes a car 102 and a utility trailer 104 with an EM-gradiometer 106 mounted to it with vertical magnetic dipole (VMD) 107 and horizontal magnetic dipole (HMD) 108 polarized antennas mounted on it. Trailer 104 comprises little or no metal, so as to reduce interference to radio signals being received. For example, the large structural parts may be make of marine fiberglass I-beams. The combination 100 is driven along a surface road 110 that can be expected to cross orthogonally above over a linear underground anomalies 112. An EM-illuminator, or transmitter, 114 generates primary waves 116 that penetrate the earth, and it too has VMD and HMD antennas. When the transmitting EM-illuminator is using its VMD antennas, the receiving gradiometer will use its HMD antennas, and vice versa. E.g., if Tx=VMD, then Rx=HMD; otherwise Tx=HMD and Rx=VMD.

An electrostatic shield, e.g., Faraday shield, may be used to cover some or all of the magnetic dipole antennas for electrical noise reduction. Such could be constructed as a sheath, bowl, or radome fashioned from sheet aluminum, or from wire mesh. The EMG receiver sensitivity can be very much improved by the use of electrostatic shields on all the magnetic dipole antennas.

Typically, carrier frequencies in the range of 2-kilohertz to 1-megahertz are selected for best effect. Linear underground anomalies 112 will reflect and produce scattered (secondary) waves 118 by virtue of its contrasting electrical conductivity and/or dielectric constant with the surrounding geology. Any pipes, wires, or rails inside the linear underground anomalies 112 will further add to the contrast and reflections into scattered (secondary) waves. The phase and magnitude of the scattered (secondary) waves 118 carry important information about the depth and track location of linear underground anomalies 112 back to the earth surface.

The scattered (secondary) waves 118 are synchronously detected by EM-gradiometer 106. Carrier synchronization information is carried back from EM-illuminator 114 to EM-gradiometer 106 by a fiberoptic cable 120. A military grade GPS receiver 122 capable of producing position fixes and velocity calculations accurate to six inches is mounted above the EM-gradiometer 106. Each magnitude and phase measurement produced by EM-gradiometer 106 of scattered (secondary) waves 118 is tagged and stored in a database of measurements, see FIG. 3. A data logger and user display for the driver could be carried inside vehicle 102. Continuous logging and display is possible by interpolating discrete points.

Figure 1B:
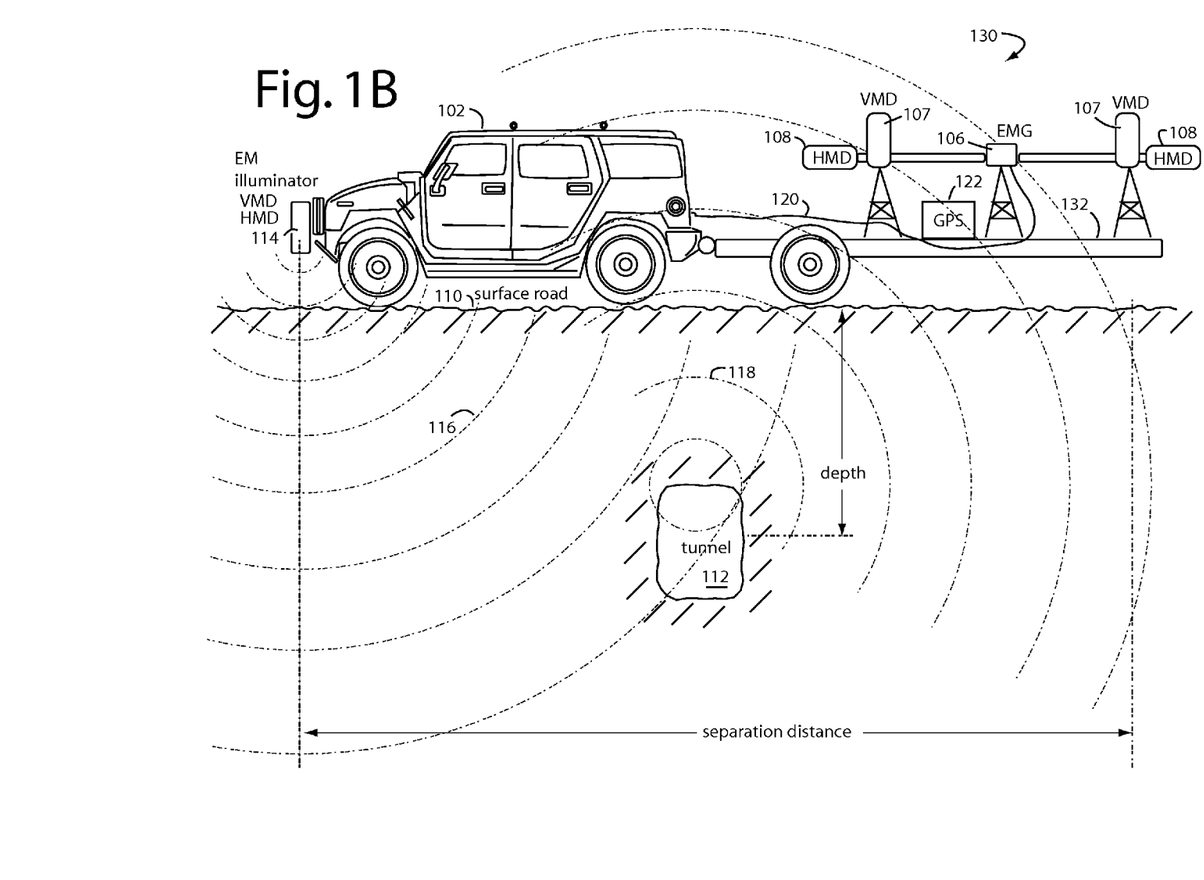
FIG. 1B is a side view diagram of a vehicle and a wheels-forward trailer that allows the EM-gradiometer being carried to be advantageously positioned much farther aft of the EM-illuminator on the front bumper for an increased separation distance.
Figure 2:
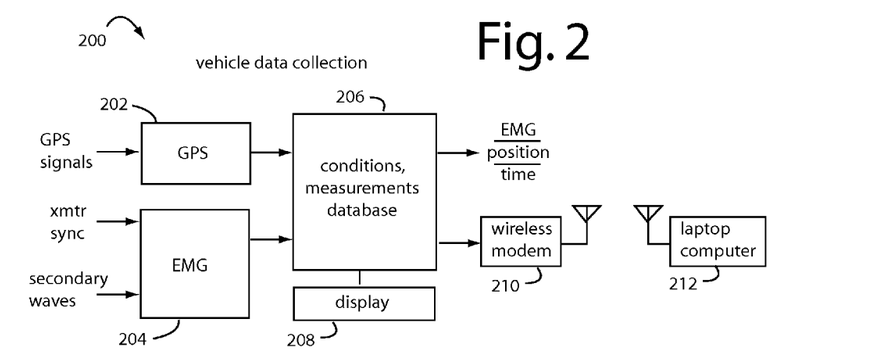
FIG. 2 is a functional block diagram of a data collection system with a remote graphics display showing the surface infrastructure and gradiometer response, and which is carried aboard the vehicle and trailer combination of FIGS. 1A, 1B, and 2.

FIG. 2 represents a data collection system 200 that could be carried aboard the vehicle and trailer combination of FIGS. 1A and 1B and used to store EM-gradiometer measurements of magnitude and phase that have been tagged with the precise geographic positions where they were taken. A very accurate GPS navigation receiver 202 provides position solutions better than six inches and is capable of doing that at vehicle speeds of up to sixty miles per hour. For example, GPS navigation receiver 202 is an authorized p-code receiver issued for United States military and government use. An EM-gradiometer 204 continuously receives and synchronously demodulates scattered (secondary) waves it receives from the ground using a transmitter sync signal. The phase and magnitude measurements are stored in a conditions and measurements database 206 that uses GPS solutions to tag the measurements with location and time information. A user display 208, or a wireless modem 210 transmitting to a laptop computer 212, provides an operational graphical user interface (GUI) and a map or other display of the surface features and the road being traveled and an interpretation of the measurements being received.

Figure 3:
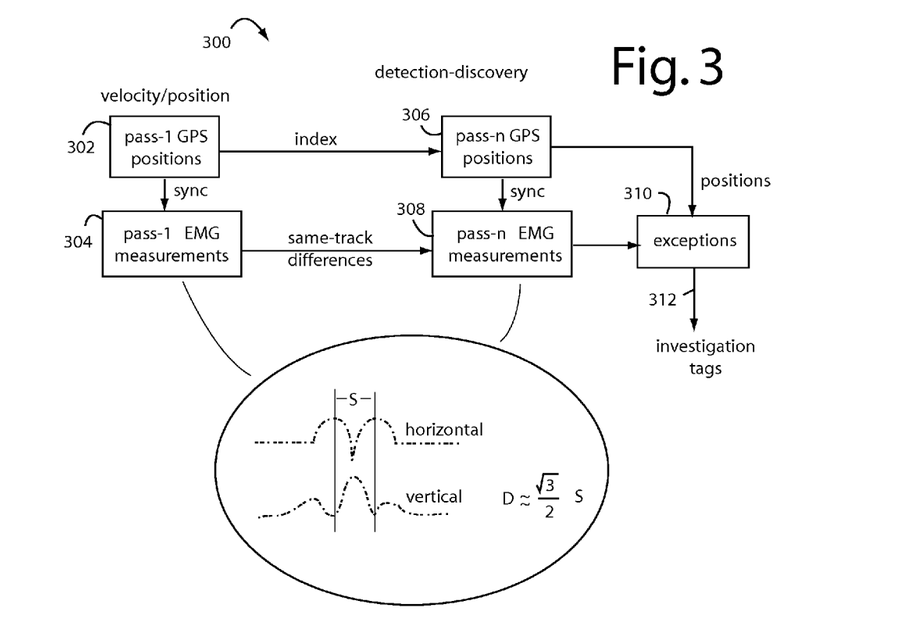
FIG. 3 is a functional block diagram of a change detection data analysis system carried aboard the vehicle and trailer combination of FIGS. 1A, 1B, and 2, or that may have its constituent parts distributed in theater command.

FIG. 3 is a functional block diagram of a data analysis system 300 that could be entirely carried aboard the vehicle and trailer combination of FIGS. 1A and 1B, or distributed in theater command over a network. As in FIG. 2, a GPS receiver provides a track of GPS position solutions 302 for tagging the locations of EM-gradiometer measurements 304 obtained on a first pass. The same or another GPS receiver provides another track of GPS position solutions 306 for tagging the locations of subsequent EM-gradiometer measurements 308 obtained on a later pass or passes. Pattern matching techniques are used to synchronize the two tracks along overlapping points. An exceptions digital signal processor 310 issues investigation tags 312 for points where the measurement data should be the same but it is not. One reason it would differ is a new linear underground anomalies has been dug beneath the road between the first and last passes of the vehicle and trailer combination of FIGS. 1A and 1B. These investigation tags 312 act as flags for immediate expert analysis. Even if only one pass was made over a particular track of points, the detection and recognition of a characteristic M-pattern (HMD gradiometer) or peak pattern (VMD gradiometer) in the measurements, as represented in the detail of FIG. 3, could be reason enough to issue an investigation tag 312. A user display and GUI with interpretation algorithmic code would help make the results easier to understand and more immediately useful.

Figure 4A:
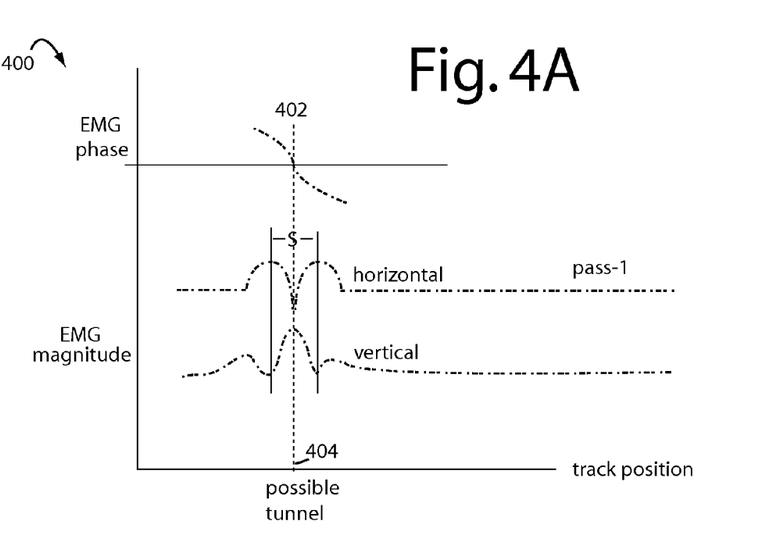
FIG. 4A is a graph representing what the phase and magnitude data collected from an EM-gradiometer carried along a road over a linear underground anomalies could look like on a first pass using the equipment of FIGS. 1A and 1B.

FIG. 4A is a graph 400 representing what the phase and magnitude data collected from EM-gradiometer 106 carried along road 110 over linear underground anomalies 112 could look like on a first pass using the equipment of FIGS. 1A and 1B. In particular, a characteristic M-pattern for HMD polarized gradiometer, or peak-pattern for VMD polarized gradiometer 402 will be observed as the vehicle crosses overhead of the linear underground anomalies 112 while moving down the road 110, and the anomaly causes an imbalance in the signals received by the EM-gradiometer. The HMD polarization has a characteristic M-shaped response. The peak-to-peak separation distance is a function of the target depth. The VMD polarization has a characteristic peak between two minimums. The response's minimum-to-minimum separation distance(S) belies the approximate target depth, $$d = \frac{\sqrt{3}}{2} S.$$

Figure 4B:
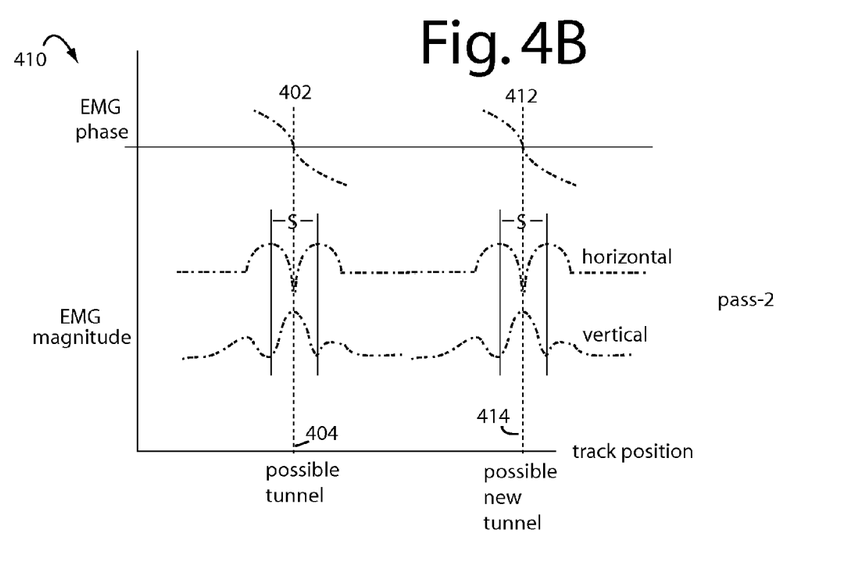
FIG. 4B is a graph representing what the phase and magnitude data collected later from the same EM-gradiometer carried along the same road could look like on a subsequent pass if a new linear underground anomalies has appeared further down the road track from a first linear underground anomalies detected on a previous pass.

FIG. 4B is a graph 410 representing what the phase and magnitude data collected later from the same EM-gradiometer 106 carried along the same road could look like on a subsequent pass if a new linear underground anomalies 112 has appeared further down the road track from the first linear underground anomalies 112 detected on a previous pass. Another characteristic M-pattern, or peak pattern 412 will be observed where there was not one before as the vehicle crosses overhead of the new linear underground anomalies.

Figure 5:
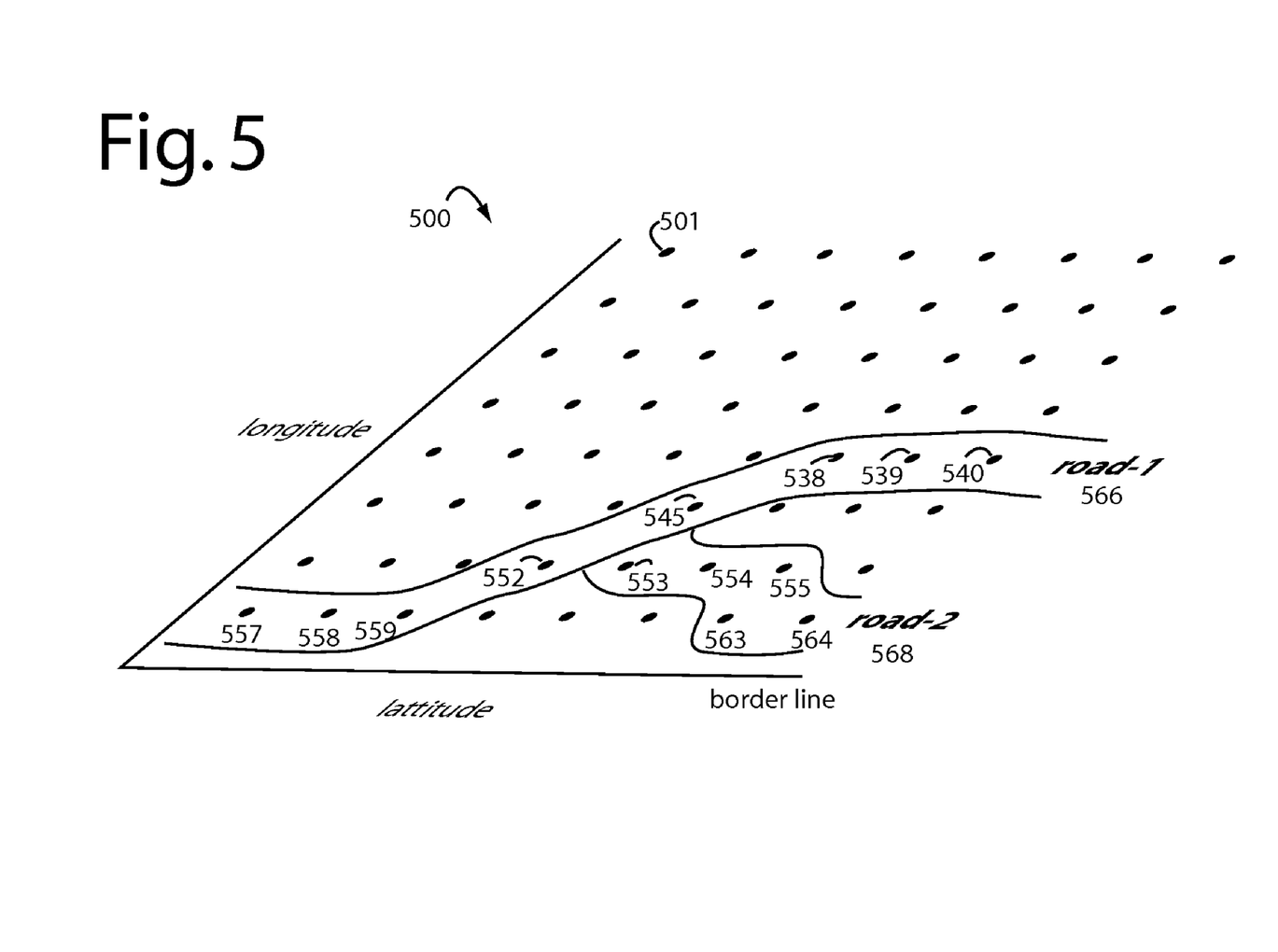
FIG. 5 represents a ground map of points in a matrix in which a road-1 and road-2 fork and have some shared points and some not-shared points, the point being that if road-1 was already surveyed, some points along its track will already be in the measurements database when road-2 is surveyed later.

FIG. 5 represents a ground map 500 of points 501-564 in a matrix in which a road-1 566 and road-2 568 fork and have some shared points 557-559 and 552, and some not-shared points 545, 538, 539, 540, 553, 554, 555, 563, and 564. The underlying essential idea being that if road-1 566 was already surveyed, some points along its track will already be in the measurements database 206 when road-2 568 is surveyed later.

A gradiometer antenna array may comprise two ferrite-core left and right magnetic dipole antennas (LMD and RMD) electrically coupled and 180-degrees out of phase.

This is called the differential mode of operation. For maximum primary wave cancellation, the HMD polarized antennas are coaxial, antenna rod axes along same axis, and oriented on a base line perpendicular to an intended target's trend. For VMD polarized gradiometer array, each antenna is parallel to the other. The HMD magnetic dipole antennas may also be connected in the summation mode of operation. In this case, the instrument would not operate as a gradiometer, but as a single magnetic dipole. LMD and RMD antennas may be configured as vertical or horizontal magnetic dipoles. During field tests, a horizontal magnetic dipole configuration was used. The instrumentation used a central electronics enclosure and telescoping antenna assembly enclosed in fiberglass. The antenna assembly tubing had a center section with the synchronization and calibration magnetic dipole antenna (SMD). Measured data was transmitted to a remote lap-top computer via an RF-Modem in the enclosure. The system was operational for six hours on a single lead-acid rechargeable battery. The gradiometer receiver could be carried by an operator using a belt and shoulder strap.

For an HMD polarized gradiometer, the source of the primary EM wave is a vertical magnetic dipole (loop antenna) mounted on the lead vehicle in the convoy. The loop antenna generates omni-directional toroidal EM field components. The primary electric field (EP) lies in a horizontal plane. There is a magnetic field (HP) component. When the primary electric field (EP) component illuminates the linear underground anomalies 112, the induced current flow (I) can be approximately determined from the long wavelength scattering limit of mathematical physics given by;

$$I = \frac{2\pi E_p}{\omega\mu \text{Log}(\kappa a)} \text{ amperes} \quad (1)$$

where $\kappa = \beta - i\alpha$; $\beta$ is the phase constant and $\alpha$ is the attenuation rate, $\omega = 2\pi f$ and f is the operating frequency in Hertz, a=radius from the linear underground anomalies, and $\mu = \mu_r \mu_o$ is the magnetic permeability.

Equation (1) shows that the induced current increases as the operating frequency is reduced. The induced current flow produces a cylindrically spreading secondary wave that is observable by vehicle trailer 104. The secondary magnetic field component is given by $$H_s = \frac{I}{2}\left(\frac{i\kappa}{2\pi r}\right)^{\frac{1}{2}} e^{-i\kappa r} \text{(far field)} \quad (2)$$

where r=the radial distance in meters from the linear underground anomalies 112 to the vehicle trailer 104. The secondary EM-wave scattered from an electrical conductor will slow decay with distance from the conductor at radial distances that are large compared with the skin depth. At radial distances that are large compared with the skin depth, the secondary cylindrically spreading EM-waves decay with the half power of distance (r) from the conductor. They are decreased in magnitude by the attenuation factor. In the near field, they decay with first power of (r).

An illuminating transmitter 114 produces a tunable continuous wave (CW) signal of 2-KHz to 1-MHz that can be directed down toward the ground surface by an antenna. For example, such antenna can be wound in a loop and mounted to the front bumper or a front receiver hitch of vehicle trailer 104.

There may be some advantage to slewing or sweeping the CW transmissions through their frequency range to take advantage of the various kinds of reflections that have frequency sensitive signatures, or to image targets hiding behind or underneath something else. A primary EM wave 116 impinges on linear underground anomalies 112 which will re-radiate a secondary EM wave 118. A synchronous receiver uses a pair of oppositely wound ferrite-core magnetic dipole antennas, e.g., left magnetic dipole (LMD) and a right magnetic dipole (RMD) in a synchronous detection configuration.

A reference synchronizing signal from the illuminating transmitter 114 is supplied, for example, over the fiberoptic cable 120. Phase and amplitude measurements of secondary signal 118 are forwarded to database 206. A global positioning system (GPS) navigation receiver 122 provides position tags for the measurements.

Mounting the illumination transmitter 114 too near the receiver 106 can swamp the RF stages, so a separation distance is needed, e.g., twenty feet.

EM-gradiometer ferrite-core magnetic dipole antennas LMD and RMD are electrically coupled and 180-degrees out of phase, e.g., the differential mode of operation. For maximum primary wave 116 cancellation, the antennas are coaxial for the HMD gradiometer, the antenna rod axes run along same axis, and on a base line parallel to the border, and thus orthogonal to the linear underground anomalies run. The magnetic dipole antennas may also be made switchable into the summation mode of operation. In the summation mode, the instrument operates as a single magnetic dipole, and not an EM-gradiometer. The LMD and RMD antennas may also be configured as vertical or horizontal magnetic dipoles. A synchronization and calibration antenna (SMD) may be included for tuning.

The system 100 can image subsurface geophysical features with greater sensitivity, range, distance, and flexibility compared to conventional instrumentation. Prior art devices that try to capitalize on preexisting radio sources for target illumination typically suffer from noise and weak signal levels.

Good operational results depend on a synchronized EM-gradiometer instrument having a narrow-band receiver that can discriminate against spectra-noise components, and that operates in the low ionosphere, earth waveguide noise band. Such maximizes the detection threshold sensitivity of the instrumentation. EM-gradiometer 106 capitalizes on a high threshold detection sensitivity to scattered EM-waves 118 in the extremely low frequency (ELF) 30-300 Hz, the very low frequency (VLF) 3-30 kHz, and low frequency (LF) 30-300 kHz bands. Synchronization to the primary wave 116 with fiberoptic 120 enables very narrow-band detection with threshold detection sensitivity in the picoTesla (pT) range. Theoretical investigations have found that the secondary EM fields 118 are typically 20-60 dB below that of the directly received primary EM field 116. A difficult instrument design issue is how to detect the secondary fields in the presence of much larger primary field components. Careful implementation of the gradiometer antennas can result in 70-dB of primary field suppression.

The source of the primary EM wave 116 can also be a vertical magnetic dipole, e.g., loop antenna, mounted on a ground vehicle in a convoy, or an opportunistic radio transmitter. Loop antennas generate omni-directional toroidal EM field components. The induced current flow produces a cylindrically spreading secondary wave that is observable by a gradiometer receiver.

System 100 could be integrated with conventional Ground Control and Tactical C4 Systems. The output from the gradiometer can be transmitted to the ground base in real time, and still frame images are compressed and transmitted over PSC-5D in conjunction with EM-gradiometer. Live video can be compressed and transmitted in real time over PRC-117F and PSC-5D links. The technology probably should be suitably hardened for use in theatre.

A browser-type graphical user interface (GUI) would be useful in trailer combinations 100 and 130 of FIGS. 1A and 1B. A number of different clickable tabs allow the selection of data, setup, GPS, and graph displays. Here, the phase and amplitude measurements from EMG receiver are plotted according to range distance. A GPS display can be used to show the position of the ground vehicle on a map relative to the suspected linear underground anomalies 112.

The magnitude of the scattered secondary wave 118 detected from an underground conductor (linear underground anomalies) infrastructure increases as the carrier frequency being used decreases. Extremely low frequency (ELF) 30-300 Hz, very low frequency (VLF) 3-30 kHz, and low frequency (LF) 30-300 kHz wavebands have a significant advantage in linear underground anomalies detection. The attenuation rate of EM-waves in the ELF/VLF/HF bands through soil and rock is very low, so deeply buried structures can be readily radio-illuminated and detected. The detected structures may even include empty passageways, or those with electrical conductors serving the utility and ventilation needs.

Linear underground anomalies and caves invariably provide electrical pathways. The electrical current flow (I) channel can be a source of the secondary EM field 118. Primary EM-waves 116 induce current into electrical pathways. In an empty linear underground anomalies case, the higher conductivity layer underlying the linear underground anomalies will channel electrical current. Conductive layers underlying the linear underground anomalies can be created naturally by soluble salts. The result is a cylindrically spreading EM wave that is observable on the surface. In either case, an subsurface induced current results in a surface detectable secondary EM wave 118.

There is a universal similarity amongst all kinds of underground facilities around the world. In part, this stems from the small number of academic institutions that educate and train the world's mining engineers, geologists, and geophysicists. The same curriculum and textbooks are subscribed to by most all the leading schools. Otherwise disperse members of the world mining community are also drawn together by trade associations and trade shows.

Many different kinds of underground structures use reinforced concrete, and the steel reinforcing is very easy to image electronically with the EM-gradiometer. Drug smuggling linear underground anomalies in the Nogales, Ariz., area would collapse if it were not for its aggressive ground control measures. Structures developed into hard rock have similar ground control requirements. Weathering at the adits can make the ground incompetent. Aggressive use of steel/wood supports along with metal screening is required, and reinforced concrete is commonly used in the construction of adits. As the entries are developed, ground control measures intensify with strata depth and with the width of the entry. Mines driven into schists use roof bolts and metal screening to cross through faults. Roof rock falls can be detected seismically with geophones. Such microseismic devices can be integrated into an EM-gradiometer for long-term monitoring.

The preferential use of pneumatic drills in mines means that a network of high pressure metal pipes must be installed to supply the compressed air. Such pipe network will reradiate electromagnetic waves as well as power cables and railroad rails. The drills and the blasting with explosives in mines also means seismic and sound detectors can be used to detect activity, especially new construction.

The linear underground anomalies boring machines (TBM) used by such operations are specialized equipment that can be tracked by commerce officials. The sale and delivery of TBM's can signal that a new search could turn up a linear underground anomalies and provide some preliminary information on where to look.

No trenching horizontal directional drilling can be used to create pneumatic transfer pipes across the border. Only the 8-hour drilling time period is allowed to detect the ditch witch drill rods. A shallow-buried linear underground anomalies was recently detected by the odd way snow melted overhead on the surface along the center line of the linear underground anomalies. Such linear underground anomalies used wood-support ground-control measures to build the linear underground anomalies. Other nearby linear underground anomalies were driven into schist with drill-and-blast methods. Evidence suggested that rail was used for muck transport. Lighting brackets were seen on the ribs (walls) of the linear underground anomalies, and their electrical conductors were EM-observables on the surface.

Mining engineers expect water will most likely be encountered in developing linear underground anomalies entries, and so mined linear underground anomalies are developed upgrade to naturally dewater the workings. The mined linear underground anomalies drainage water therefore must be pumped from the linear underground anomalies. In sulfide-bearing rock mass, the drainage water will be acidic, and discolor the surface soil and retard vegetation. Such water may form an electrical conductor.

Bacteria of two types always seem to be associated with mine linear underground anomalies ventilation. When sufficient oxygen is present, the relatively warm and moist underground environment fosters rapid accumulation of aerobic bacteria strains. But in the poorly or not ventilated areas, carbon dioxide (black damp) builds up, and anaerobic bacteria grows rapidly. Septic conditions can also generate hydrogen sulfide and methane.

Mine ventilation engineers try to drive fresh air through the mined linear underground anomalies entries and into the working areas with a "primary fan" that is located as near the linear underground anomalies as possible, e.g., in an air door. Overpressure is typically generated by the primary fan in the mined linear underground anomalies to push air out the exhaust vents at the deep end of the linear underground anomalies. Sometimes air ducts are used to carry fresh air to the working area, and the used air exits at the adit. The ventilation system may also be designed around an exhaust fan system. Some ventilation tubing includes electrically conductive spiral wire that can reradiate signals that are observable on the surface with EM-detectors.

Large underground mines and other facilities have trouble maintaining adequate air ventilation, so lots of small fans will usually be found to assist the main fans. Three-phase electric utility power is generally required for big ventilation fans because of the large horsepower electric motors they use. The smaller fans are usually connected to single-phase power.

The power cables depended on to supply the fans can be expected to radiate secondary EM-waves 118 and also waveguide the primary EM-waves 116 deeper into the lower parts of the underground facility or linear underground anomalies 112.

The electric field vanishes at zero frequency. There is an optimum frequency for inducing maximum current for magnetic dipole sources. Primary EM-waves that propagate in earth-ionosphere waveguide signals are quasi-transverse EM-waves (TEM).

A gradiometer antenna is designed to measure the gradient of the cylindrical spreading EM-wave. The reception of secondary EM-waves in the rock mass surrounding the linear underground anomalies or on the surface confirms the existence of nearby electrical conductors.

Passageway conductors essentially create an induced current distribution network throughout the linear underground anomalies. The attenuation rate for signals propagating on electrical conductors is typically less than 1.0 dB per kilometer at fifty KHz. The current appears on the electric power and telephone cables entering the complex through any adits. Switches will not disrupt all the induced current flow because the grounding conductors are never switched. However, open switches and any isolation transformers can attenuate the signal.

The total field is the sum of the primary and secondary field. Usually the total field changes by only a few percent, but the gradient changes by tens of percent when an EM-gradiometer is passed over a conductor. If quasi-TEM earth-ionosphere waveguide signals are used, EM-waves couple across the air-soil boundary and propagate downward. The attenuation rate and phase shift for a uniform plane wave propagate in natural medium with a typical relative dielectric constant of ten. The propagation constant can be estimated for various types of natural media.

The electrical conductivity of most natural media increases with frequency. The lower frequency signal attenuation rate decreases from high frequency values, so deeper targets may be detected using lower frequencies. Ground-penetrating radar (GPR) technologies are inappropriate to find linear underground anomalies, at one-hundred MHz in a 10-1 S/m media, the attenuation rate is just too great. It's about 39-dB per meter, and such prevents receiving minimum signals at surface.

One advantage of an EM-gradiometer is that it can be used on the surface. Radiowave interference from distant sources will be plane waves that can be easily suppressed by the gradiometer antenna. The gradiometer measurements of linear underground anomalies 402 response typically exhibit a high signal-to-noise (SNR) ratio which is favorable for reducing the false alarm rate (FAR).

For a sinusoidal signal embedded in white electrical noise, synchronous detection maximizes the threshold detection sensitivity. Typically, a well-designed receiver will exhibit a noise figure near 2-dB. The noise bandwidth (BN) will be the predominating problem in any receiver design.

The receiver threshold sensitivity increases as bandwidth is reduced. By synchronizing the receiver to the EM-wave illuminating the target, the receiver bandwidth can be made very small. Alternatively, a wider bandwidth can be used in the design where sampling and averaging can be used to achieve effective bandwidth. However, this type of system would not be able to discriminate the discrete spectrum.

An EM-wave magnetic field component threading an area of an induction coil of N-turns produces an electromotive force voltage (EMF). A ferrite rod with an initial permeability of 5,000 and a length/diameter ratio of twelve achieves a relative permeability of one hundred twenty. The induced EMF increases with the first power of N and operating frequency.

For a one inch diameter ferrite rod, noise is expected to be 0.02 picoTesla in a 1-Hertz bandwidth. The signal-to-noise ratio is, SNR=50.

The primary EM-wave illuminating the ground surface may alternatively be received by a series-tuned sync magnetic dipole antenna (SMD). An EMF signal of typically 32-microvolts per picoTesla will be amplified by a programmable gain controlled amplifier (PGA), e.g., 60 dB of gain. A mixer-filter frequency transposes the signal into the intermediate frequency (IF) signal, and provides an additional gain of 78-dB. The IF signal is filtered and limited to form a square wave. The square wave signal is applied to the phase-locked loop (PLL) phase detector (PD). A phase detector and voltage controlled oscillator (VCO) produce the in-phase (I) and quadrature (Q) sampling gate signals.

The EM-gradiometer array signal is typically amplified by programmable gain control amplifier (PGA). The mixer-filter circuit results in the frequency transportation of the gradiometer signal to the intermediate frequency (IF) signal. The IF gradiometer signal can be applied to in-phase (I) and quadrature (Q) sampling gates.

The I and Q gate output signals are applied to separate integrators. The output of each integrator is applied to an analog-to-digital converter (ADC). After integration, the rectified signals are processed by a microcomputer.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A detection system, comprising:
   a primary wave EM-illuminator with vertically and horizontally polarized magnetic dipole antennas for transport along a surface road during operation and for providing primary EM-waves directed into the ground;
   an electro-magnetic (EM) gradiometer for synchronously detecting EM-waves scattered from underground objects illuminated by said primary EM-waves with vertically and horizontally polarized magnetic dipole antennas while being transported along said surface road during operation;
   wherein, if said horizontally polarized magnetic dipole antenna is selected for the primary wave EM-illuminator, said vertically polarized magnetic dipole antenna is selected by the EM gradiometer for detecting said EM-waves scattered from underground objects; and
   wherein, if said vertically polarized magnetic dipole antenna is selected for the primary wave EM-illuminator, said horizontally polarized magnetic dipole antenna is selected by the EM gradiometer for detecting said EM-waves scattered from underground objects.

2. The detection system of claim 1, further comprising:
   an electrostatic shield covering some or all of said magnetic dipole antennas, and providing for electric field noise reduction.

3. The detection system of claim 1, further comprising:
   a navigation receiver for providing location tags for any measurements obtained by the EM gradiometer.

4. The detection system of claim 1, further comprising:
   a database for collecting and storing any measurements obtained by the EM gradiometer; and
   a navigation receiver for providing location tags for EM gradiometer measurements stored in the database.

5. The detection system of claim 1, further comprising:

a processor for comparing measurements obtained by the EM gradiometer obtained at different times but for the same locations, and for issuing investigation tags that call for further analysis of the causes of the differences in said measurements.

6. A system for the electronic detection of linear underground anomalies passing under border patrol roads, comprising:

a vehicle trailer for attaching to a tow vehicle;

a primary wave EM-illuminator with vertically and horizontally polarized magnetic dipole antennas for mounting to the front of said tow vehicle, or a device for using an opportunistic radio station as an EM-illuminator;

an electro-magnetic (EM) gradiometer attached to the vehicle trailer, and for synchronously detecting EM-waves scattered from underground objects illuminated by primary EM-waves from the EM-illuminator;

a right magnetic dipole (RMD) antenna and a left magnetic dipole (LMD) antenna included in the EM-gradiometer for receiving said scattered EM-waves and able to reject primary EM-waves;

vertically and horizontally polarized magnetic dipoles disposed in a gradiometer antenna array, wherein their vertical polarizations may be at a different frequency than their horizontal polarizations, and the transmission and the reception are cross polarized;

a conductor for providing a reference signal to the EM-gradiometer derived from said primary EM-waves for synchronous receiver detection;

a processor for synchronous detection and for obtaining measurements of the phase and amplitude of said scattered EM-waves; and a graphical user interface (GUI) for displaying information about the location of underground border linear underground anomalies that were computed from said measurements of the phase and amplitude;

wherein vehicle may be used for transporting the EM-gradiometer over said local area during periods said objects are being radio illuminated.

7. The system of claim 6, further comprising:

a first pair of left and right magnetic dipole antennas coaxial to one another and wound on opposite ends of a common cylindrical core;

a second pair of left and right magnetic dipole antennas coaxial to one another and wound on opposite ends of a common cylindrical core, and set orthogonal to and in a vertical parallel plane with the first pair of left and right magnetic dipole antennas, wherein HMD and VMD polarization can be selected for use;

a synchronous receiver for recovering phase and amplitude information for secondary EM wave signals recovered by the first and second pairs of left and right magnetic dipole antennas, and using synchronous detection to produce corresponding phase and amplitude measurements; and a navigation receiver for producing position tags that can identify the locations of objects radiating said secondary EM wave signals.

8. The system of claim 6, further comprising:

an increased separation distance between the left and right hand magnetic dipoles for improving a gradient response detection sensitivity.

* * * * *